United States Patent Office 3,223,673
Patented Dec. 14, 1965

3,223,673
MASTICATING RUBBER WITH VANADIUM ACETYLACETONATE AS THE PRINCIPAL PEPTIZING AGENT
Gerard Kraus and Kent W. Rollmann, Bartlesville, Okla., assignors to Phillips Petroleum Company, a corporation of Delaware
No Drawing. Filed Oct. 29, 1962, Ser. No. 233,918
10 Claims. (Cl. 260—34.2)

This invention relates to an improvement in the masticating of rubber. In another aspect, it relates to an improved process for masticating rubber, such as natural rubber and rubbery polymers of 1,3-butadiene, through the use of a novel peptizing agent. In another aspect, it relates to improved processable rubber compositions, and to the vulcanized compositions thereof.

In the manufacturing operations for producing vulcanized rubber articles, it is the usual practice to subject the unvulcanized rubber to mastication, mechanical working, or milling in the presence of air or oxygen to change the rubber to a more soft, pliable condition prior to molding or shaping the rubber or vulcanizing the same. This mastication, for example on a roll mill, internal mixer, or screw plasticator, breaks the tenacity of the rubber and the degree to which it is broken down is influenced by the time, temperature and the vigor of the mechanical working. With some types of rubber the desired changes can be achieved only under prolonged treatment which is frequently accompanied by detrimental changes in the properties of the vulcanizates. In order to reduce the time and power required to improve the processability of the rubber and prevent deterioration of the rubber resulting from extended milling operations, it is a common practice to incorporate into the rubber a peptizing or chemical plasticizing agent which accelerates the effect of the mechanical working of the rubber and facilitates incorporation of compounding ingredients such as carbon black and other reinforcing agents, accelerators, vulcanizing agents, etc. Many of the peptizing agents used heretofore have given some improvement in the processability of the rubber, but many of these agents must be used in fairly large amounts to bring about satisfactory acceleration in the processing of the rubber, some give rise to disagreeable odor or odor development in the rubber, while others are toxic while in contact with the skin or inhaled.

Accordingly, an object of this invention is to improve the processing, mechanical working, or mastication, of unvulcanized rubber, such as a natural rubber and synthetic rubbery polymers of conjugated dienes, particularly 1,3-butadiene, by incorporating into the rubber to be masticated a novel peptizing agent. Another object is to provide improved processable rubbers which can be masticated or mechanically worked in a relatively short time and with low power requirements. Another object is to enhance the breakdown of rubber by masticating the same with a combination of a novel peptizing agent and known peptizing agents. A further object is to provide improved vulcanized rubber compositions by vulcanizing novel peptized rubber compositions. Further objects and advantages of this invention will become apparent to those skilled in the art from the following discussion and appended claims.

Briefly, we have discovered that the mastication or mechanical working of unvulcanized rubbers can be improved by incorporating vanadium acetylacetonate into such rubbers. The improved processability of such rubbers through the use of vanadium acetylacetonate is particularly surprising and unexpected in view of the fact that other metal acetylacetonates do not give such improved processability.

The vanadium acetylacetonate can be employed as a peptizing agent in relatively low amounts (in many instances, much lower than prior art peptizers) and does not create an odor problem in handling or use. This peptizing agent is incorporated into the rubber and the mixture milled or masticated in a conventional rubber masticator or mixer in the presence of air or oxygen, the mixing time being dependent to some extent on the vigor of the mixing action. Mastication of the rubber in the presence of the peptizing agent of this invention can take place prior to compounding with conventional compounding ingredients, or can take place in the presence of such compounding ingredients. It is also within the scope of this invention to carry out the mastication in the presence of the peptizing agents of this invention together with so-called "physical plasticizers," such as aromatic oils.

We have also discovered that the breakdown of rubber through the use of conventional peptizing agents can be enhanced by carrying out the mastication in the presence of vanadium acetylacetonate. For example, the vanadium acetylacetonate peptizing agent of this invention can be used in conjunction with unsymmetrically substituted hydrazines and their salts, such as those disclosed in U.S. Patent, 2,018,643, for example phenylhydrazine, o-tolylhydrazine, asymmetrical diphenylhydrazine, phenyl dithio carbazimic phenylhydrazine, N,N' b-oxyethyl phenylhydrazine, 1-naphthylhydrazine, acetone phenylhydrazone, phenol salt of phenylhydrazine, phenylhydrazine hydrochloride, and the like. Aryl mercaptans can also be used, such as those disclosed in U.S. Patents 2,064,580, as well as certain of their divalent heavy metal salts, e.g., zinc, cadmium, nickel, tin, and lead salts; representative aryl mercaptans include m-chlorothiophenol, p-phenylthiophenol, stearyl ring substituted thiophenol, p-mercaptodiphenylmethane, 2,3-dimercaptonaphthalene, 2-mercaptoanthracene, pentachlorothiophenol, thio-beta-naphthol, xylyl mercaptan, p-tert-butylbenzenethiol, trichlorophenyl mercaptan, trichloroxylyl mercaptan, trichlorothiocresol, and the like. Unsaturated cycloaliphatic mercaptans such as cyclododecadienyl mercaptan can also be used. Another group of peptizing agents of the prior art which can be used in conjunction with the vanadium acetylacetonate of this invention is the cadmium and zinc salts of phenol or naphthol, or alkyl-substituted radicals thereof, thiocarboxylic acids, such as those disclosed in copending application Serial No. 201,284, filed June 11, 1962, by G. Kraus et al., for example, cadmium thiobenzoate, zinc thiobenzoate, cadmium thio-1-naphthenate, cadmium thio-2-naphthenate, zinc thio-1-naphthenate, cadmium thio-p-methylbenzoate, zinc thio-p-hexylbenzoate, cadmium thio-m-diisopropylbenzoate, zinc 4 - methyl - 4' - ethylthiobenzoate, cadmium, 2,4-dimethylthiobenzoate, cadmium 3,3'-dimethylthio-1-naphthenate, zinc 4-methyl - 5 - ethyl - 5'-ethyl-7'-propylthio-2-naphthenate, and the like.

The amount of vanadium acetylacetonate peptizing agent used in this invention to accelerate the breakdown of rubber during mastication thereof can vary and will be dependent upon a number of factors. Stated functionally, the amount to be used will be a small amount sufficient to accelerate the breakdown of rubber; the particular amount employed will depend upon the type of rubber, conditions of mastication, whether or not other peptizing agents are used in conjunction therewith, and other factors. Usually, the amount of vanadium acetylacetonate used will be in the range of 0.005 to 1 part by weight per 100 parts rubber, though generally not more than 0.55 part by weight per 100 parts of rubber will be necessary, the preferred range being from 0.01 to 0.3 part by weight per 100 parts rubber. (This basis is usually abbreviated in the art as "phr.") When the vanadium acetylacetonate is used in conjunction with a conventional peptizing agent, such as those mentioned above, the amount of vanadium acetylacetonate will be generally less than one-half that of the combined peptizers. Where such combined peptizers are used, the vanadium acetylacetonate preferably will be in the range of 0.01 to 0.3 part by weight per 100 parts rubber, and in many instances less than 0.05 part of vanadium acetylacetonate per 100 parts rubber will get satisfactory results. The amount of the conventional peptizing agent used in the combination with the vanadium acetylacetonate will also vary and be dependent upon various factors, but generally the amount of conventional peptizing agent will be in the range from 0.05 to 2 parts by weight per 100 parts of rubber. In particular, excellent results can be obtained by combining the vanadium compound with 0.05 to 1 part by weight of phenylhydrazine, xylyl mercaptan, or pentachlorothiophenol per 100 parts of rubber, and excellent results can be obtained by combining the vanadium compound with 0.2 to 2 parts by weight of p-tert-butylbenzenethiol per 100 parts rubber.

The temperature of the mastication can vary but generally will be above 100° C. and preferably at least 110° C., the peptizing action being relatively slow at lower temperatures. Temperatures up to 250° C. can be used.

The rubbers which can be treated by our invention include natural rubber and synthetic rubbery polymers of conjugated dienes, especially synthetic rubbery polymers of 1,3-butadiene. Such conjugated dienes normally contain from 4 to 12 carbon atoms per molecule and those containing from 4 to 8 carbon atoms are preferred. Examples of such conjugated dienes include 1,3-butadiene, isoprene, piperylene, 1,3-octadiene, 4,5-diethyl-1,3-octadiene, and the like. The polymers of conjugated dienes include not only the homopolymers of these dienes and copolymers of the dienes with each other but also copolymers of conjugated dienes in major amount with other copolymerizable monomers such as styrene, 1-vinylnaphthalene, 2-methyl-5-vinylpyridine, methyl methacrylate, acrylonitrile, and the like. Our invention is particularly valuable and we prefer to practice it with polybutadienes having relatively high cis configuration, and the term "cis-polybutadiene" is used herein and in the appended claims to mean a polybutadiene polymer in at which at least 75 percent, preferably at least 85 percent, of the polymer is formed by 1,4-addition of 1,3-butadiene and has the cis configuration. Polybutadienes of this type are frequently produced having inherent viscosities between 2.3 and 3.0 and it is highly desirable that such polymers be treated in order to reduce their inherent viscosity to a value in the range of about 1.7 to 2.3 for the sake of improved processability.

Inherent vicsosity is determined by placing 0.1 gram of polymer in a wire cage in 100 milliliters of toluene and allowing the polymer to stand at room temperature (about 25° C.) for 24 hours. The cage is then removed and the solution filtered through a sulfur absorption tube of grade C porosity to remove solid particles. The solution is then passed through a Medalia-type viscometer at 25° C., the viscometer having been calibrated with toluene. The inherent viscosity is calculated by dividing the natural logarithm of the relative viscosity by the weight of the original sample. The relative viscosity is the ratio of the viscosity of the polymer solution to that of toluene.

The microstructures of the polymers are determined by dissolving a sample of the polymer in carbon disulfide to form a solution of 25 grams of polymer per liter of solution. Using a commercial infrared spectrometer the infrared spectrum of the solution (percent transmission) is then determined.

The percent of the total unsaturation present as trans 1,4- is calculated according to the following equation and consistent units:

$$\epsilon = \frac{E}{tc}$$

where $\epsilon$ is extinction coefficient (liters-mols$^{-1}$-centimeters$^{-1}$); E is extinction (log $I_0/I$); $t$ is path length (centimeters); and $c$ is concentration (mols double bond/liter). The extinction is determined at the 10.35 micron band and the extinction coefficient is 146 (liters-mols$^{-1}$-centimeters$^{-1}$).

The percent of the total unsaturation present as 1,2- (or vinyl) is calculated according to the above equation, using 11.0 micron band and an extinction coefficient of 209 (liters-mols$^{-1}$-centimeters$^{-1}$).

The percent of the total unsaturation present as cis 1,4- is obtained by subtracting the trans 1,4- and 1,2- (vinyl) determined according to the above procedure from the theoretical unsaturation, assuming one double bond per each $C_4$ unit in the polymer.

The rubber compositions of this invention can have incorporated therein the various compounding materials, including reinforcing pigments such as carbon black, zinc oxide, magnesium carbonate, etc., and other fillers, sulfur, accelerators, and the novel peptizing or chemical plasticizing agent of this invention. Stocks from such compositions will be useful for footwear, extruded articles, tire carcasses, tire treads, and other mechanical goods.

The objects and advantages of this invention are further illustrated in the following examples, but it should be understood that the materials, conditions, and proportions used in these examples are only typical and should not be construed to limit this invention unduly.

EXAMPLE I

The effect of variable quantities of vanadium acetylacetonate on the breakdown of cis-polybutadiene in air was determined by mastication of the elastomer in a Brabender Plastograph with and without the vanadium acetylacetonate. The cis-polybutadiene employed was prepared by the polymerization of 1,3-butadiene in the presence of a catalyst system comprising triisobutylaluminum, titanium tetrachloride, and iodine. It was a gel-free polymer that had a Mooney value (ML–4 at 212° F.) of 46.5, an inherent viscosity of 2.54, a cis content of 94.9%, a trans content of 2.0%, and a vinyl content of 3.1%.

Vanadium acetylacetonate was milled into the polymer on a cool two-inch roll mill before charging into the Plastograph. The jacket temperature of the Plastograph was regulated at 100° C. and the recorders set and zeroed. The polymer was cut into ribbons and fed into the mixing head as rapidly as possible with the mixer set at approximately 25 r.p.m. This operation required less than a minute. The charge weight to the Plastograph was 47 grams. The mixing was then started by starting the motor and setting the speed at 100 r.p.m. The torque (meter-kilograms) required to turn the rotors was noted, the final torque being an indication of the breakdown of the rubber. Total mixing time for each sample was 6 min. As stated hereinbefore, a control run was made without any additive. Another run was made using a prior art peptizer, namely iron phthalocyanine. Quantities of additives together with initial (0.5 min.) and final torque (6 min.) are shown in the following table.

Table I

| Run | Additive | Amt. of additive, phr. | Initial torque, m.-kg. | Final torque, m.-kg. |
| --- | --- | --- | --- | --- |
| 1 | None | 0 | 2.10 | 1.98 |
| 2 | Iron phthalocyanine | 0.035 | 2.15 | 1.45 |
| 3 | V-acetylacetonate | 0.035 | 2.12 | 1.39 |
| 4 | V-acetylacetonate | 0.5 | 2.00 | 1.29 |

The data show that vanadium acetylacetonate is an effective peptizer for cis-polybutadiene, and that it is as effective as a well known prior art peptizer, iron phthalocyanine.

EXAMPLE II

Small quantities of vanadium acetylacetonate were employed in conjunction with several prior art rubber peptizers. The effect of these peptizer combinations on the breakdown of cis-polybutadiene in air was determined in the manner described in Example I using the same polymer unless otherwise designated. Control runs were made using the several thiols, cadmium thiobenzoate, or phenylhydrazine as the sole peptizer. Runs are summarized in the following table. The average initial torque (0.5 min.) of these runs was 2.10 m.-kg.

One control run was made without any peptizer. The recipe for the cis-polybutadiene-carbon black compositions was as follows.

Table III

| | Parts by weight |
|---|---|
| Cis-polybutadiene | 100 |
| High abrasion furnace black (Philblack O) | 60 |
| Aromatic oil (Philrich 5) | 10 |
| Lauric acid | 2 |
| Peptizer | Variable |

Table II

| Run | Amt. of V-acetylacetonate, phr. | Other additive Name | Total amt., phr. | Active amt., phr. | Final torque, m.-kg. |
|---|---|---|---|---|---|
| 1 | 0 | Pentachlorothiophenol | 1.5 | 0.5 | 1.64 |
| 2 | 0.05 | ___do___ | 1.5 | 0.5 | 1.09 |
| 3 | 0 | Thio-beta-naphthol | 1.5 | 0.5 | 1.80 |
| 4 | 0.05 | ___do___ | 1.5 | 0.5 | 1.42 |
| 5 | 0 | Xylyl mercaptan | 1.37 | 0.5 | 1.63 |
| 6 | 0.05 | ___do___ | 1.37 | 0.5 | 1.03 |
| 7 | 0.05 | ___do___ | 1.0 | 0.36 | a 1.31 |
| 8 | 0.05 | ___do___ | 0.5 | 0.17 | a 1.40 |
| 9 | 0.03 | ___do___ | 1.0 | 0.36 | a 1.32 |
| 10 | 0.01 | ___do___ | 1.5 | 0.55 | a 1.38 |
| 11 | 0.01 | ___do___ | 1.0 | 0.36 | a 1.39 |
| 12 | 0 | Phenylhydrazine | 0.5 | 0.5 | 1.23 |
| 13 | 0.05 | ___do___ | 0.5 | 0.5 | 1.06 |
| 14 | 0.05 | ___do___ | 0.25 | 0.25 | a 1.18 |
| 15 | 0.05 | ___do___ | 0.10 | 0.10 | a 1.29 |
| 16 | 0.03 | ___do___ | 0.20 | 0.20 | a 1.19 |
| 17 | 0.01 | ___do___ | 0.25 | 0.25 | a 1.23 |
| 18 | 0.01 | ___do___ | 0.10 | 0.10 | a 1.38 |
| 19 | 0 | Cadmium thiobenzoate | 0.5 | 0.5 | 1.97 |
| 20 | 0.05 | ___do___ | 0.5 | 0.5 | 1.42 |
| 21 | 0 | Cyclododecadienyl mercaptan | 1.15 | 1.15 | 1.93 |
| 22 | 0.05 | ___do___ | 1.15 | 1.15 | 1.33 |
| 23 | 0 | p-tert-Butylbenzenethiol | 1.15 | 1.15 | a 1.64 |
| 24 | 0.05 | ___do___ | 1.15 | 1.15 | a 1.02 |
| 25 | 0.05 | ___do___ | 0.5 | 0.5 | a 1.30 | a The cis-polybutadiene used in these runs had a Mooney value (ML–4 at 212° F.) of 42, inherent viscosity of 2.52, 0% gel, 95.5% cis-, 1.4% trans-, and 3.1% vinyl configurations.

These data show that a greater increase in breakdown of the cis-polybutadiene occurred when very small amounts of vanadium acetylacetonate were employed in conjunction with thiols, cadmium thiobenzoate, and phenylhydrazine than when these prior art materials were used alone.

EXAMPLE III

The effect of vanadium acetylacetonate alone and in combination with p-tert-butylbenzenethiol, phenylhydrazine, anl xylyl mercaptan on the breakdown of a cis-polybutadiene composition containing carbon black was determined by mastication of the elastomer composition in a Brabender Plastograph. The cis-polybutadiene was the same as that employed in Example I unless otherwise designated and the procedure was the same as described therein except for the conditions given below and the charge weight to the Plastograph which was 57 grams.

Carbon black and other additives, including peptizer ingredients when used, were milled into the polymer on a cool two-inch roll mill before charging into the Plastograph. The jacket temperature of the Plastograph was regulated at 65° C., mixing speed was 150 r.p.m., and the total mixing time was 6 min. Data on these runs are shown in the following table.

Table IV

| Run | Amt. of V-acetylacetonate, phr. | Other additive Name | Total amt., phr. | Active amt., phr. | Final torque, m.-kg. |
|---|---|---|---|---|---|
| 1 | 0 | None | 0 | 0 | 2.70 |
| 2 | 0.1 | ___do___ | 0 | 0 | a 2.19 |
| 3 | 0.3 | ___do___ | 0 | 0 | a 2.08 |
| 4 | 0 | p-tert-Butylbenzenethiol | 1.5 | 1.5 | a 2.04 |
| 5 | 0.005 | ___do___ | 1.5 | 1.5 | a 1.92 |
| 6 | 0 | Phenylhydrazine | 0.5 | 0.5 | 2.16 |
| 7 | 0.05 | ___do___ | 0.5 | 0.5 | 2.15 |
| 8 | 0.05 | Xylyl mercaptan | 1.37 | 0.5 | 2.18 |
| 9 | 0.03 | ___do___ | 1.00 | 0.36 | a 2.09 | a The cis-polybutadiene used in these runs had a Mooney value (ML–4 at 212° F.) of 42, inherent viscosity of 2.52, 0% gel, 95.5% cis-, 1.4% trans-, and 3.1% vinyl configurations.

The compositions from runs 1, 2, 3, 6, 7 and 8 were compounded in accordance with the following recipe:

Table V

| | Parts by weight |
|---|---|
| Cis-polybutadiene-carbon black composition | 172 |
| Zinc oxide | 3 |
| Stearic acid | 2 |
| Sulfur | 1.6 |
| Santocure a | 1 | a N-cyclohexyl-2-benzothiazolesulfenamide.

The stocks were cured 40 min. at 307° F. and physical properties determined. Results are shown in Table VI. The property "$\nu \times 10^4$" is the number of effective network chains per unit volume of rubber, the higher the number the more the rubber is crosslinked (vulcanized), this property being determined by the swelling method of Kraus, as given in Rubber World 135, 67–73, 254–260 (1956). The properties termed "300% modulus," "tensile" and "elongation," were determined on a Model TM Instron Tensile Machine, wherein the rubber specimens (0.020 x 0.125 inch) were pulled from a 2-inch gage length at a cross-head speed of 20 inches/min. at room temperature; the rubber specimens were marked with marks 1 inch apart and the 300% modulus was obtained by noting the strain of the sample when the marks were 4 inches apart (300% elongation). The property termed "Shore A" hardness was determined by ASTM D 676–55T on a Shore Durometer, Type A. The property termed "resilience" was determined according to ASTM D–945–55 (modified), using a Yerzley oscillograph, with right circular cylinder specimens 0.7 inch in diameter and 1 inch high. The property termed "ΔT" (heat buildup) was determined according to ASTM D 623–52T, Method A, using a Goodrich Flexometer, 143 lbs./sq. in. load, 0.175 inch stroke, with right circular cylinder test specimens measuring 0.7 inch in diameter and 1 inch in height.

of carbon black. A comparison of runs 4 and 5 (Table IV) shows that the peptizing action of the thiol was enhanced by the presence of a very small amount of vanadium acetylacetonate. Substantially the same peptizing action was achieved in runs 6 and 7 (Table IV) but the vulcanizate containing the vanadium acetylacetonate had better properties (Table VI) as evidenced by the higher modulus, higher tensile strength, and lower heat build-up. In general, the properties of all the peptized stocks were better than those of the unpeptized control stock.

EXAMPLE IV

The peptizing action of a combination of vanadium acetylacetonate with xylyl mercaptan in both natural rubber and a butadiene/styrene copolymer was determined using the procedure described in Example I. A run was also made using vanadium acetylacetonate and phenylhydrazine in natural rubber. Controls were run on each rubber using no peptizing agent and on xylyl mercaptan and phenylhydrazine without vanadium acetylacetonate. The butadiene/styrene rubber (SBR 1500) has a Mooney value (ML–4 at 212° F.) of 52 and 23.5 wt. percent bound styrene; this rubber was prepared by emulsion polymerization using a rosin acid soap, and coagulation was effected by the salt-acid technique. The following results were obtained.

*Table VII*

| Run | Rubber | Amt. of V-acetyl-acetonate, phr. | Other additive | | Torque | |
|---|---|---|---|---|---|---|
| | | | Name | Active amt., phr. | Min. | m.-kg. |
| 1 | Butadiene/styrene | 0 | None | 0 | 6 | 1.7 |
| 2 | do | 0 | Xylyl mercaptan | 0.365 | 6 | 1.35 |
| 3 | do | 0.3 | do | 0.365 | 6 | 1.13 |
| 4 | Natural | 0 | None | 0 | 4 | 1.68 |
| 5 | do | 0 | Xylyl mercaptan | 0.365 | 6 | 1.02 |
| 6 | do | 0.3 | do | 0.365 | 4 | 0.86 |
| 7 | do | 0 | Phenylhydrazine | 0.2 | 4 | 1.37 |
| 8 | do | 0.3 | do | 0.2 | 4 | 1.08 |

*Table VI*

| | Cured products of stocks from runs of Table V | | | | | |
|---|---|---|---|---|---|---|
| | 1 | 2 | 3 | 6 | 7 | 8 |
| $\nu \times 10^4$, Moles/cc | 1.94 | 2.07 | 2.07 | 1.98 | 1.97 | 1.99 |
| 300% Modulus, p.s.i | 1,330 | 1,680 | 1,760 | 1,880 | 2,080 | 1,890 |
| Tensile, p.s.i | 1,880 | 2,350 | 2,570 | 2,570 | 2,730 | 2,460 |
| Elongation, percent | 400 | 420 | 390 | 380 | 370 | 370 |
| Shore A hardness | 67 | 65 | 63 | 63 | 66 | 64 |
| ΔT, °F | 63 | 52 | 47 | 48 | 45 | 51 |
| Resilience, percent | 70 | 74 | 78 | 78 | 78.5 | 77 |

The foregoing data show that vanadium acetylacetonate alone and in combination with thiols and with phenylhydrazine is an effective peptizer when used in the presence These data show that the peptizer combinations were very effective in both types of rubber and that the effects of xylyl mercaptan and phenylhydrazine were enhanced by the presence of vanadium acetylacetonate.

EXAMPLE V

The peptizing action of vanadium acetylacetonate in a butadiene/styrene polymer, natural rubber, and cis-polybutadiene was determined using the procedure described in Example I. Control runs were made on each rubber using no peptizing agent. The butadiene/styrene rubber used was the same as that of Example IV and the cis-polybutadiene used was the same as that described in footnote "a" of Table II. Results are set forth in Table VIII.

*Table VIII*

| Run | Rubber | Amt. of V-acetyl-acetonate, phr. | Torque | | | |
|---|---|---|---|---|---|---|
| | | | Initial (0.5 min.) | | Final (6 min.) | |
| | | | Temp. °F. | m.-kg. | Temp. | m-kg. |
| 1 | Butadiene/styrene | 0 | 111 | 2.76 | 150 | 1.96 |
| 2 | do | 0.3 | 123 | 2.32 | 143 | 1.38 |
| 3 | Natural | 0 | 119 | 2.34 | 152 | 1.57 |
| 4 | do | 0.3 | 121 | 2.09 | 136 | 0.87 |
| 5 | cis-Polybutadiene | 0 | 122 | 2.02 | 154 | 1.85 |
| 6 | do | 0.3 | 111 | 1.99 | 143 | 1.45 |

The data of Table VIII show in the case of each of the rubbers that the vanadium acetylacetonate was an effective peptizer.

Various modifications and alterations of this invention will become apparent to those skilled in the art from the foregoing discussion and examples without departing from the scope and spirit of this invention, and it should be understood that this invention is not to be limited unduly to that set forth herein for illustrative purposes.

We claim:

1. In the process of masticating a rubber selected from the group consisting of natural rubber and rubbery polymers of conjugated dienes, the improvement comprising incorporating vanadium acetylacetonate into said selected rubber in an amount sufficient to enhance the breakdown of said rubber.

2. In the process of masticating a rubbery polymer of 1,3-butadiene, the improvement comprising incorporating vanadium acetylacetonate into said polymer in an amount in the range of 0.005 to 1 part by weight per 100 parts polymer.

3. The process according to claim 2 wherein said polymer is cis-polybutadiene.

4. The process according to claim 2 wherein xylyl mercaptan peptizer is incorporated into said polymer in addition to said vanadium acetylacetonate.

5. The process according to claim 2 wherein phenylhydrazine peptizer is incorporated into said polymer in addition to said vanadium acetylacetonate.

6. The process according to claim 2 wherein cyclododecadienyl mercaptan peptizer is incorporated into said polymer in addition to said vanadium acetylacetonate.

7. The process according to claim 2 wherein p-tert-butylbenzenethiol peptizer is incorporated into said polymer in addition to said vanadium acetylacetonate.

8. The process according to claim 2 wherein pentachlorothiophenol peptizer is incorporated into said polymer in addition to said vanadium acetylacetonate.

9. The process according to claim 2 wherein thio-beta-naphthol peptizer is incorporated into said polymer in addition to said vanadium acetylacetonate.

10. The process according to claim 2 wherein cadmium thiobenzoate peptizer is incorporated into said polymer in addition to said vanadium acetylacetonate.

References Cited by the Examiner

UNITED STATES PATENTS

| | | | |
|---|---|---|---|
| 2,018,643 | 10/1935 | Williams et al. | 260—761 |
| 2,064,580 | 12/1936 | Williams et al. | 260—761 |
| 2,795,549 | 6/1957 | Abbott et al. | 260—429 |

FOREIGN PATENTS 221,121  3/1959  Australia.

MORRIS LIEBMAN, *Primary Examiner.*